US 6,708,591 B1

(12) United States Patent
Kern et al.

(10) Patent No.: US 6,708,591 B1
(45) Date of Patent: Mar. 23, 2004

(54) CLUTCHLESS WIRE CUTTING APPARATUS

(75) Inventors: Michael Kern, South Beloit, IL (US); Irvin Burns, Waloon Lake, MI (US)

(73) Assignee: Rockford Manufacturing Group, Inc., South Beloit, IL (US)

( * ) Notice: Subject to any disclaimer, the term of this patent is extended or adjusted under 35 U.S.C. 154(b) by 508 days.

(21) Appl. No.: 09/304,021

(22) Filed: May 3, 1999

(51) Int. Cl.$^7$ ............... B21F 11/00; B26D 5/28
(52) U.S. Cl. ............... 83/76; 83/359; 83/364; 83/370; 83/907
(58) Field of Search ............... 83/62, 62.1, 63, 83/364, 359, 358, 76, 73, 74, 950, 370, 907

(56) References Cited

U.S. PATENT DOCUMENTS

| | | | | |
|---|---|---|---|---|
| 3,604,300 A | * | 9/1971 | Allison et al. ............... | 83/76 |
| 3,736,821 A | * | 6/1973 | Obenshain ............... | 83/76 |
| 4,158,976 A | * | 6/1979 | Ditges ............... | 83/364 |
| 4,170,155 A | * | 10/1979 | Saiton et al. ............... | 83/76 |
| 4,387,614 A | * | 6/1983 | Evans ............... | 83/76 |
| 4,464,959 A | * | 8/1984 | Larson ............... | 83/76 |
| 4,497,229 A | * | 2/1985 | Carrington et al. ............... | 83/76 |
| 4,512,225 A | * | 4/1985 | Green ............... | 83/76 |
| 4,532,840 A | * | 8/1985 | Antonissen ............... | 83/364 |
| 4,543,863 A | * | 10/1985 | Rader ............... | 83/76 |
| 4,585,600 A | | 4/1986 | Rollyson et al. ............... | 264/3.3 |
| 4,781,090 A | * | 11/1988 | Feldkamper et al. ............... | 83/76 |
| 5,205,190 A | * | 4/1993 | Kohring ............... | 74/574 |
| 5,433,065 A | * | 7/1995 | Mosby ............... | 56/13.9 |
| 5,713,256 A | * | 2/1998 | Keeny ............... | 83/76 |
| 5,850,773 A | * | 12/1998 | Burns ............... | 83/950 |
| 5,857,393 A | * | 1/1999 | Kohiyama ............... | 83/62 |
| 5,921,160 A | * | 7/1999 | Yankaitis et al. ............... | 83/950 |
| 6,508,152 B1 | * | 1/2003 | Kern et al. ............... | 83/76 |

\* cited by examiner

*Primary Examiner*—Stephen Choi
(74) *Attorney, Agent, or Firm*—Leydig, Voit & Mayer, Ltd.

(57) ABSTRACT

A clutchless wire cutting apparatus for successively cutting off leading end portions of a predetermined length of wire from a wire stock. The wire is advanced through a cutting station which includes the cutting apparatus. The cutting apparatus includes an electrical motor whose output is coupled to the cutter mechanism which performs the successive wire cuts. A proximity switch or sensor located downstream of the cutting station signals a controller each time the wire reaches the desired length to periodically generate an electrical current to the electrical motor for selectively intermittently driving the motor at a relatively high frequency corresponding to the frequency at which wire cuts are made. The motor may also be continuously driven for cutting shorter wire lengths. The motor has an output on an motor shaft which is coupled to a cutter shaft via a belt drive. The cutter shaft includes an eccentric cam which acts directly on the wire cutter. A proximity sensor or switch is also provided at the cutting station to determine the location of the wire cutter to provide a home position for the system.

17 Claims, 7 Drawing Sheets

CLUTCHLESS WIRE CUTTING APPARATUS

FIELD OF THE INVENTION

The present invention generally relates to wire cutting apparatus and more particularly relates to the drive mechanics and control mechanisms for controlling the operation of a wire cutting apparatus.

BACKGROUND OF THE INVENTION

Wire manufacturers typically coil wire, usually of a predetermined number of lineal feet, onto relatively large spools or into coils. Before the wire is used or shipped to market, it is often necessary to cut the wire from the coil into shorter segments also of a predetermined length. In order to transform the wire from the curvilinear shape it assumes as a result of being coiled, a wire straightening apparatus is often provided to straighten the wire and alleviate any radial forces tending to bend the wire. Straightened wire can then be feed through a wire cutting apparatus along a predetermined path to make the aforementioned segments of relatively short length.

In order to automate and optimize the cutting process, a release mechanism that includes a proximity sensor is provided downstream of the cutting apparatus to sense the presence of wire and signal the cutting apparatus to make each cut at the appropriate time when the desired length of wire segment is reached. Such a release mechanism is disclosed in Yankitis, U.S. patent application Ser. No. 08/868,908 assigned to Rockford Manufacturing Group, the entire disclosure of which is hereby incorporated by reference. The cutter is often a blade or shearing knife which oscillates up and down to partially or fully cut through the wire. A wiper is typically provided in conjunction with the cutting apparatus to break the wire segment away from the rest of the wire stock if necessary. Such a wiper mechanism is disclosed in Burns, U.S. Pat. No. 5,850,773 assigned to Rockford Manufacturing Group, the entire disclosure of which is hereby incorporated by reference. This automation technology has significantly reduced labor and manufacturing costs and increased production rates.

To periodically cut wire each time the proximity sensor senses the desired length of wire, the prior art has typically provided a continuously rotating electric motor that has an output connected to the input of a one-revolution clutch/brake mechanism whose output acts to operate the cutter. The clutch/brake mechanism is normally disengaged and thus the clutch/brake mechanism output and the cutter are normally idle. When the wire advances to the desired and suitable length, the clutch/brake mechanism is automatically engaged and acts to operate the cutter to cut through the wire, at the end of which the clutch/brake mechanism is automatically disengaged. Typically the clutch/brake mechanism is engaged at a relatively high frequency on the order of about 2–3 times every second (depending upon the length of wire segments cut) to successively cut relatively short segments of wire from the wire stock.

While the clutch/brake mechanism provides adequate speed and achieves the advantages of automation, the clutch/brake mechanism is susceptible to reliability problems. In particular, frequent engagement and disengagement of the clutch/brake mechanism to successively cut wire segments results in short clutch/brake mechanism life. It may be necessary to replace the clutch/brake mechanism of a wire cutting apparatus on the order of several times a year, or even monthly, which in turn results in temporary shutdown of the cutting apparatus and costly and laborious replacement of the clutch/brake mechanism.

SUMMARY OF THE INVENTION

It is the main objective of the present invention to increase the reliability of a wire cutting apparatus and provide a more practical wire cutting apparatus.

In that regard, it is a specific objective to reduce the number of temporary breakdowns in a wire cutting apparatus caused by rapid deterioration of the clutch/brake mechanism It is another objective of the present invention to reduce the cost of providing and operating a wire cutting apparatus.

It is another related objective of the present invention to increase production rates of a wire cutting apparatus.

According to one aspect of the present invention, a wire cutting apparatus includes an electrical motor carried by the support having an output driving a cutter holder which holds the wire cutter. A first proximity sensor arranged in sensory communication with the wire cutter produces a signal indicating location of the wire cutter relative to the wire path. A second proximity sensor arranged downstream of the cutting station, produces a signal indicating presence of wire in proximity to the end of the predetermined wire path. A controller is responsive to the proximity sensors to control output to the electrical motor. The controller selectively generates a first electrical output to the motor to work the wire cutter into the predetermined wire path and a second electrical output to decelerate the motor and maintain the wire cutter adjacent to the wire path, thereby allowing wire to advance.

According to another aspect of the present invention, a wire cutting apparatus includes an electrical motor carried by the support having an output oscillating the cutter holder and therefore the wire cutter. The motor has run and stop modes for selectively oscillating or holding the cutter stationary. The motor is capable of oscillating the cutter at a first frequency during a continuous run mode of the motor. A proximity sensor is arranged downstream of the cutting station for producing an output signal indicating presence of wire in proximity to the end of the predetermined wire path. A controller selectively generates an output to the electrical motor in response to output signals from the proximity sensor. The controller continuously drives the electrical motor when a second frequency of the output signal from the proximity sensor is at least equal to or greater than the first frequency thereby to continuously cut wire segments without the necessity of stopping the motor. The controller intermittently switches the motor between run and stop modes when the second frequency is less than the first frequency, thereby allowing for longer segments of wire to advance.

According to another aspect of the present invention, a cutting apparatus comprises means that includes an electrical motor for actuating a cutting means up to a first maximum frequency to cut off successive leading end portions of wire. Sensing means arranged downstream of the cutting station produces output signals indicating presence of wire in proximity to the end of the predetermined wire path. Control means selectively generates an electrical output to the electrical motor in response to output signals of the sensing means. The control means continuously drives the electrical motor when a second frequency of the output signal from the sensing means is at least equal to or greater than the first maximum frequency and cyclically accelerates and decelerates the electrical motor when the second frequency is less than the first frequency.

Advantages of running the motor in a continuous run mode is that the life span of the motor and driven components may be increased and that the production rate may be increased by as much as about 100%. Advantages of cyclically accelerating and decelerating the motor is that wire can be advanced at a selected feed rate as desired, thereby allowing for longer segments of wire to be cut.

Other object and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
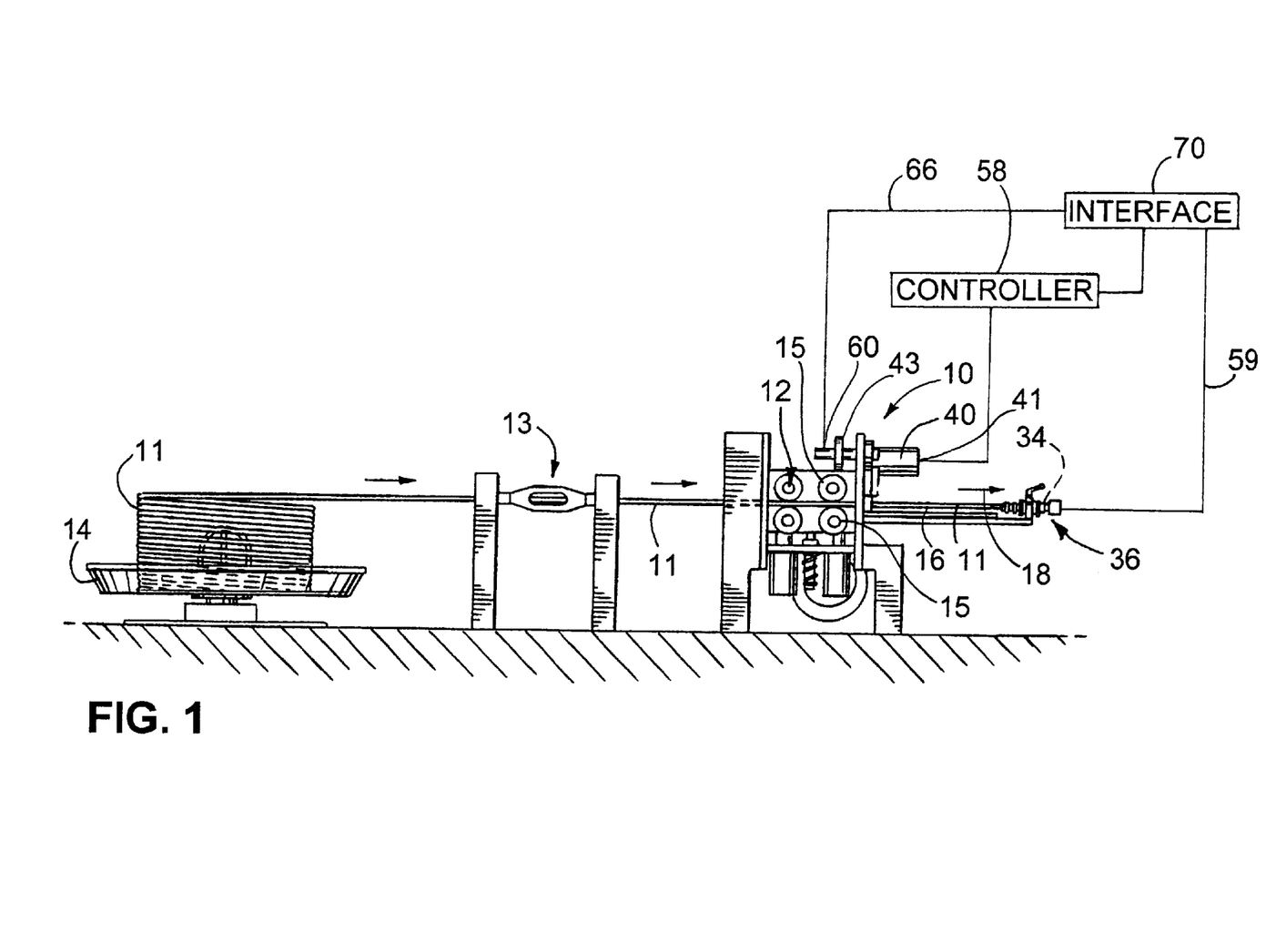
FIG. 1 is a front elevational view in partial schematic form which illustrates a new and improved wire cutting apparatus according to a preferred embodiment of the present invention in a typical operating environment.

For purposes of illustration and referring to FIG. 1, a preferred embodiment of the present invention has been shown in the drawings as incorporated in a cutting apparatus 10 for cutting off successive leading end portions of an elongated length of wire 11 adapted to be advanced along a predetermined wire path 18 (the wire path being shown schematically in FIG. 1 by arrows above the actual wire path which is occupied by the wire 11 to indicate direction of wire advancement). While the cutting apparatus 10 may be used in many different applications, it herein has been shown in conjunction with a feed mechanism 12 which pulls wire 11 through a wire straightening apparatus 13, that in turn is supplied with wire stock from an unwinding station 14, or from a wire drawing machine.

Figure 2:
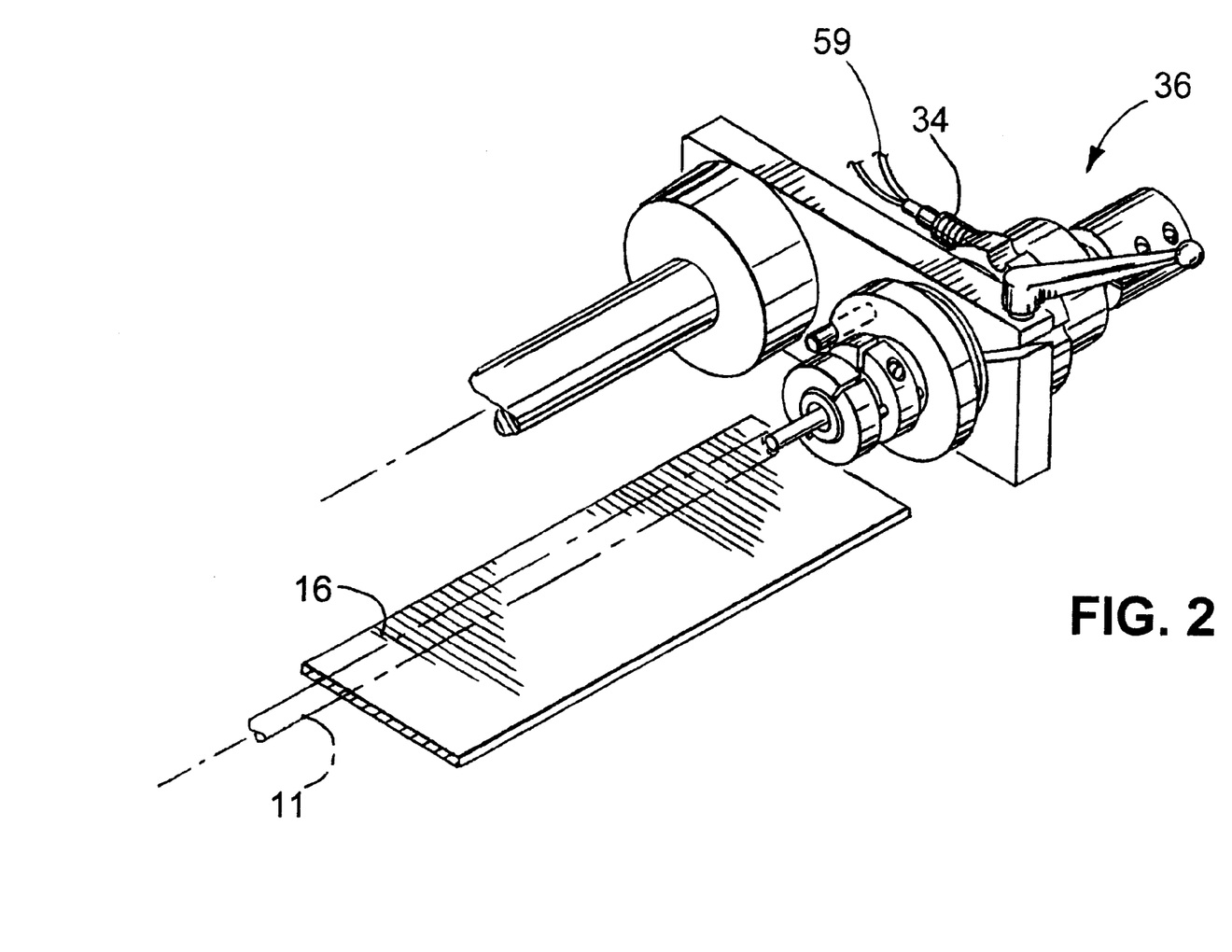
FIG. 2 is a perspective view an exemplary release assembly used in the preferred embodiment of FIG. 1.
Figure 3:
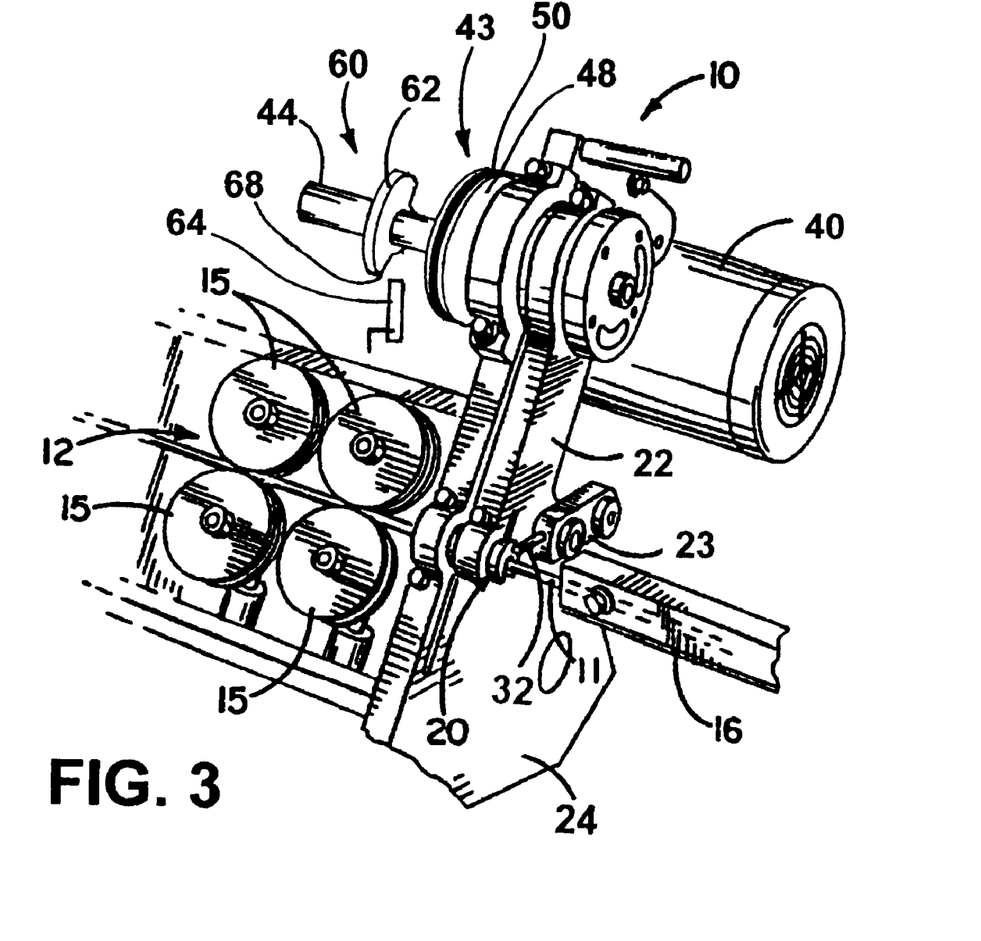
FIG. 3 is an enlarged perspective view of the wire cutting apparatus illustrated in FIG. 1.

The feed mechanism 12, the straightening apparatus 13 and the wire supply and unwinding station 14 do not constitute part of the invention and do not need to be describe in further detail. It will suffice to say that the feed mechanism 12 includes two pairs of upper and lower feed rolls 15 (FIG. 2) which are rotated so as to pull the wire through the straightening apparatus 13 and to advance the straightened wire through and past the cutting apparatus 10 toward an output station. Each time a wire length of suitable dimension is advanced past the cutter 10, the leading end segment of the wire is cut off from the remaining length of wire stock, the cutting taking place at a cutting station located just downstream of the feed mechanism 12. During the cutting operation, the leading end segment of the wire is advanced through a conventional trough 16 located immediately downstream of the cutting station. After each cut, the bottom of the trough is automatically opened in a well known manner to enable the cut-off leading end segment of wire to drop downwardly out of the path of the next leading end portion of the wire.

The cutting apparatus 10 includes a conventional cutter 20 held by a cutter holder in the form of an elongated arm 22 which is adapted to be cyclically worked into the predetermined wire path 18. In the presently preferred embodiment, the elongated arm 22 is oscillated upwardly and downwardly. The elongated arm 22 is pivotably connected to a link 23 at hinge or pivot point 25 which is in turn pivotably connected to a main support in the form of a supporting bracket 24 at a hinge or pivot point 26 to provide for oscillating movement of wire cutter 20 into and out of the predetermined wire path 18. The cutter 20 is clamped in a lower end portion of the arm 22 by a screw 27. The screw 27 may be loosened so that the cutter 20 may be removed for sharpening or replaced with a new cutter or a cutter adapted to shear wire of a different gauge. As shown most clearly in FIG. 4, the cutter herein is in the form of a blade having a generally U-shaped throat whose upper edge defines an arcuate cutting edge 28.

When the cutter 20 is advanced through its cutting stroke, the cutting edge 28 engages the wire 11 at a location closely adjacent the support bracket 24 and closely adjacent an arbor 30 mounted to the bracket 24 which is used to guide the wire through the cutting station. The arbor 30 supports the wire 11 for shearing by the cutter 20. In some cases, the cutting edge 28 passes completely through the wire and thus completely severs the leading end portion of the wire from the remaining wire stock. In other cases, usually for larger gauge wire, the cutter 20 is set so that the cutting edge 28 penetrates only part way through the wire, although the part penetration serves to completely sever the wire. In that case, however, the material of the wire may remain "attached" even though the wire is technically severed. As such, the cutting apparatus may further include a wiper mechanism 32 for detaching the recently cut-off leading end portion of wire. In particular, the wiper mechanism 32 moves downwardly into engagement with the wire shortly after the cutter 20 engages the wire as illustrated in FIGS. 6–9. If the material at the cut remains attached, the action of the wiper mechanism separates the material and moves the cut end out of the path of the advancing lead end. In both cases, the wiper mechanism pushes the cut-off portion of wire downwardly into the trough 16 in order to enable the next length of wire to quickly advance. In the present case, the wiper mechanism 32 acts through the movement of the link 23 Further details of the link 23 and wiper mechanism 32 may be had with reference to Burns, U.S. Pat. No. 5,850,773. However, other types of wiper mechanisms such as those generally discussed in Burns, U.S. Pat. No. 5,850,773 may also be used.

To signal the need for a cut, a proximity sensor in the form of an end proximity switch 34 is provided downstream of the cutting station in sensory communication with the predetermined wire path 18 for producing an output signal indicating presence of wire at some point downstream of the cutting station. In the preferred embodiment, the proximity switch 34 is located in an adjustable release assembly 36 that easily allows the length of the cut-off wire segments to be shortened or lengthened as desired. The proximity switch 34 is mechanically activated by the release assembly 36 and therefore is indirectly activated, but may alternatively be located in a position to sense the wire 11 directly. Further details of the exemplary release assembly 36 can be had with reference to Yankitis, U.S. patent application Ser. No. 08/868,908. However, other forms of proximity sensors and other prior release mechanisms such as those generally discussed in Yankitis, U.S. patent application Ser. No., 08/868,908 may also be used with a preferred embodiment.

Figure 4:
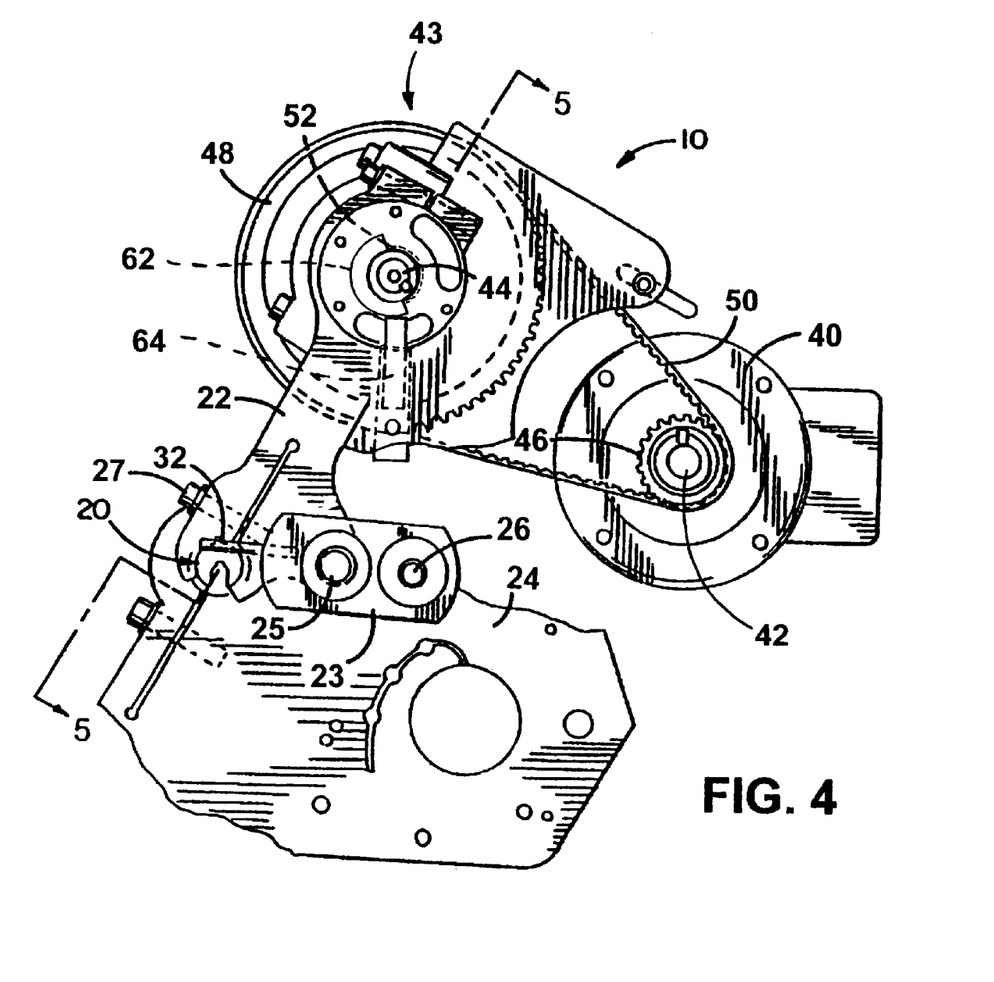
FIG. 4 is an elevational end view of the wire cutting apparatus illustrated in FIG. 3.
Figure 5:
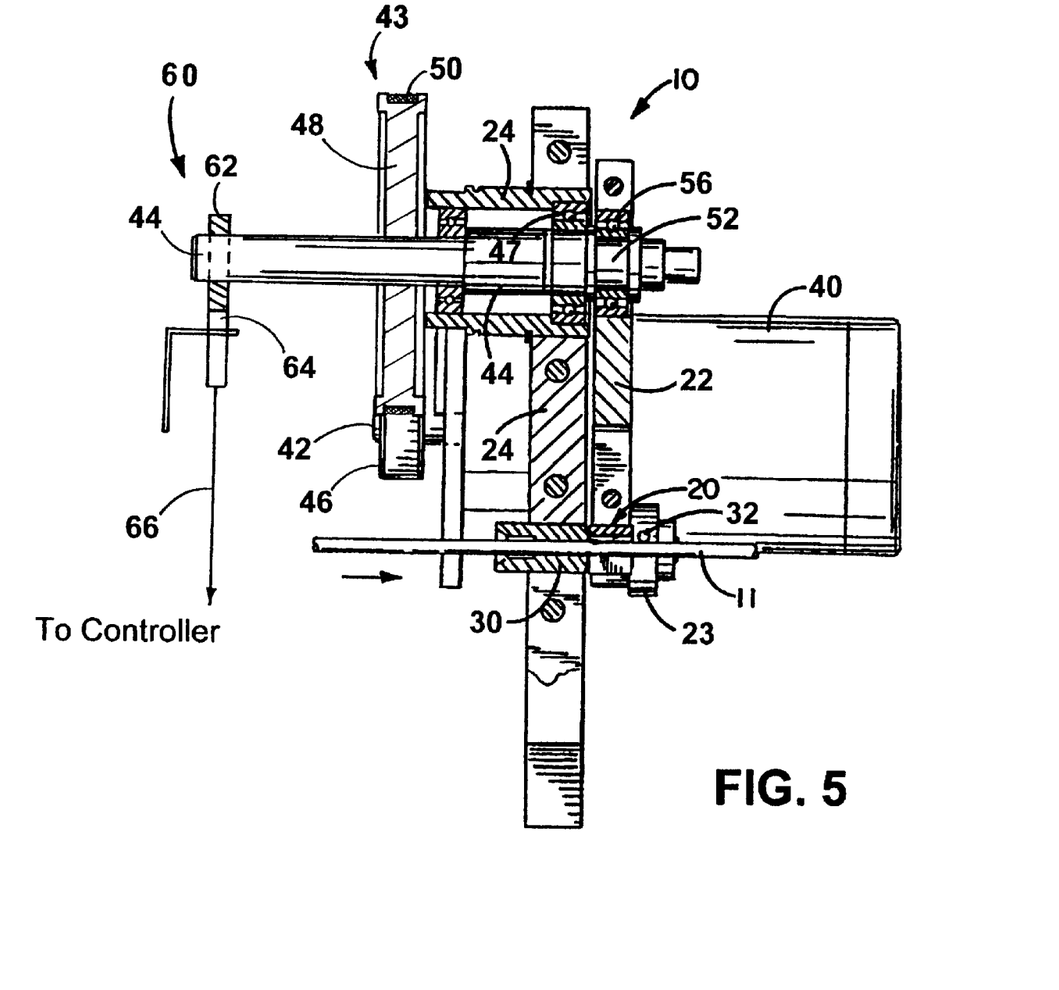
FIG. 5 is a cross-section taken substantially along line 5—5 of FIG. 4.
Figure 6:
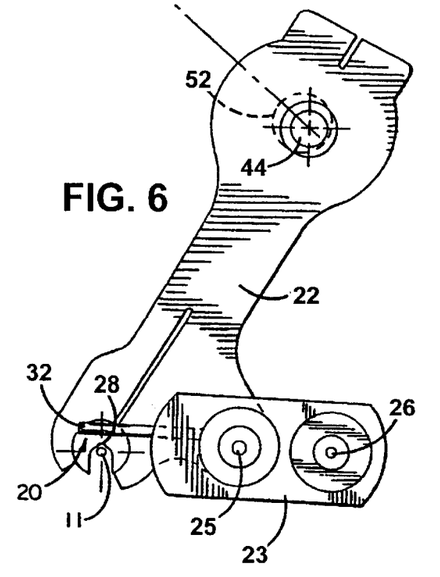
FIGS. 6–9 are schematic side views which show successive positions of the cutter and wiper blade.
Figure 7:
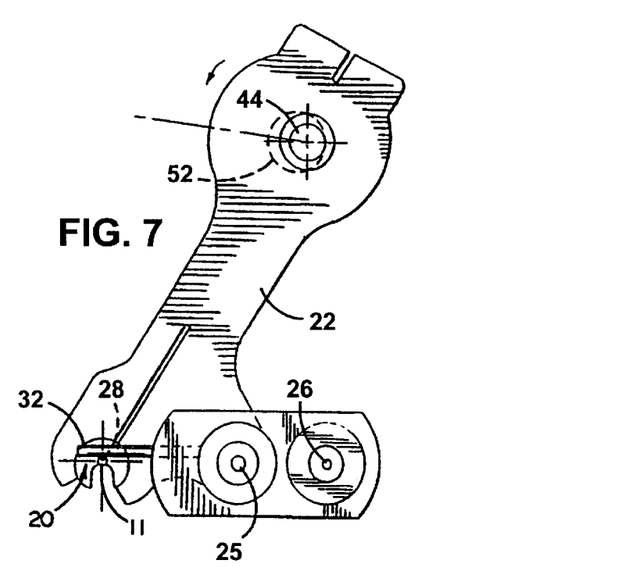
Figure 8:
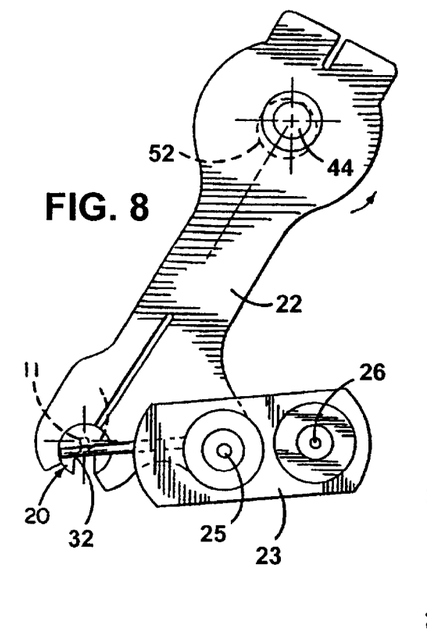
Figure 9:
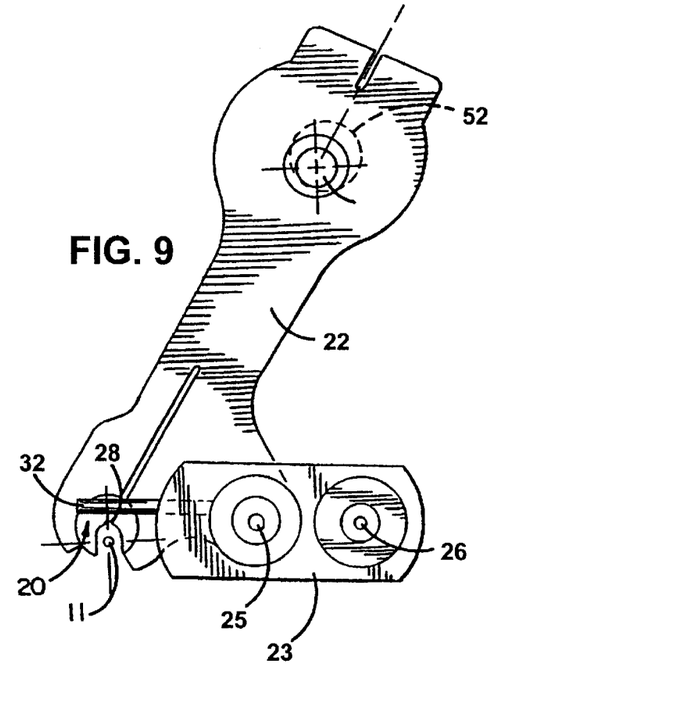

In accordance with one of the aspects of the present invention, the periodic cutting operations are directly performed by the output of an electrical motor 40, without the need for a clutch/brake mechanism. This eliminates the problems relating to clutch/brake mechanism wear such as frequent and costly clutch/brake mechanism replacement. The electrical motor 40 is mounted on the support bracket 24 and includes an electrical input in the form of input wire 41 for receiving electrical current for driving the motor. Referring to FIGS. 4–5, the output of the electrical motor 40 is provided to a motor shaft 42 that is coupled through a direct drive (in the form of a belt drive 43) to a cutter shaft 44. The cutter shaft 44 is journalled in a pair of bearings 47 mounted on the support bracket 24 to provide for rotation of the cutter shaft 44 relative to the support bracket 24 about a longitudinal axis. In the preferred embodiment, the belt drive 43 includes a smaller sprocket 46 affixed to the motor shaft 42, a larger sprocket 48 affixed to the cutter shaft 44 and an endless toothed belt 50 entrained around the sprockets 46, 48 whereby the cutter shaft 44 and motor shaft 42 rotate in unison at a predetermined gear ratio determined by the relative effective diameters of the sprockets 46, 48. Preferably, the gear ratio is about 3 to about 1 to reduce the required torque output of the motor necessary for sufficiently cutting the desired sizes of wire, but any acceptable gear ratio may be used depending upon the output of the selected motor and the cutting force requirements of the application. It will be appreciated that other direct drives such as a chain drive could also be used. A higher torque capacity motor could also alternatively be directly connected to the cutter shaft 44 having its output thereon thereby eliminating the belt drive 43, however, such a motor is less preferred due to the extra expense of a higher torque motor.

To provide for oscillating movement of the arm 22 and cutter 20, an eccentric cam 52 is provided on the cutter shaft 44 near the distal end opposite the larger sprocket 48. The eccentric cam 52 is a circular member whose center axis is offset from the rotational axis of the cutter shaft 44. The cam 52 is journalled in bearings 56 which are secured to the cutter arm 22 such that the cam 52 acts directly on the cutter arm 22, whereby rotation of the cam 52 causes oscillating movement of the cutter arm 22 to work the cutter 20 into and out of the predetermined wire path 18. Oscillating movement of the cutter 20 and in this case the wiper mechanism 32 can be had with reference to FIGS. 6–9.

In accordance with another aspect of the present invention, the preferred embodiment includes electrical control means in the form of an electronic controller 58 generating a variable frequency drive electrical current to the electrical motor 40 for selectively driving the motor 40 at a frequency corresponding to the frequency at which signals are received from the downstream proximity switch 34 via line 59 and through logic interface 70.

In the preferred embodiment, the motor 40 is of the alternating current type, which is relatively inexpensive, and the electronic controller 58 is an AC drive, and more specifically a direct torque variable frequency drive. Only a few of the variable frequency drives commercially available are adequate for use in a preferred embodiment. An acceptable variable frequency drive is one that is able to provide fast responsive motion control such as that sold under the tradename ACS 600 MOTIONCONTROL DIRECT TORQUE CONTROL (DTC) DRIVE commercially available from ABB INDUSTRY OY of Helsinki, Finland. However, it will be appreciated that other suitable controllers which can achieve the quick and frequent acceleration and deceleration of a motor may also be selected. The electrical motor 40 is selected for compatibility with the electronic controller 58 and in the currently preferred embodiment, takes the form of a three phase induction alternating current motor that is capable of accelerating and decelerating quickly. In the preferred embodiment, the electronic controller 58 (in the form of the AC variable frequency drive) produces a sinusoidal wave that quickly accelerates the AC motor 40 and switches the motor 40 to a "run mode" which rotates the output shaft 42. The electronic controller 58 also produces a non-sinusoidal wave form (O hz) that sharply decelerates the motor 42 and switches the motor 42 and switches to a "stop mode" to provide a magnetic field or flux which acts as an electrical brake to hold the position of the output shaft 42. During the stop mode, there may be slight oscillations of the output shaft due to slight magnetic fluxes in the motor, but the output shaft is substantially stationary and hence the cutter is substantially stationary and at a position adjacent to the wire path 18 so as not to obstruct advancement of the wire 11.

At this point it should be apparent that minimum cycle time needed for each oscillating cycle of the cutter 20 depends upon the maximum achievable speed of the motor output shaft 42 during a continuous operation of the motor 40. A practical range of minimum cycle time necessary for one oscillation of the cutter 20 may be between about 100 and about 500 milliseconds, (roughly in the neighborhood of 300 milliseconds). If the minimum cycle time is greater than or equal to the time necessary for wire 11 to advance to the release assembly 36 to its full predetermined length, then the motor 40 may be run continuously without the need to intermittently stop the motor. This may be the case for cutting relatively short segments of wire 11 below a predetermined length magnitude. It is an advantage when cutting shorter segments of wire that the production rate or number of cuts may be increased by roughly about 100% by running the motor 40 and cutter 20 continuously and not cyclically starting and stopping the motor. Depending upon the length of the wire segments to be cut, about 4–5 wire cuts may be made each second. This may also increase lifespan of the motor and driven components of the cutter apparatus. If the minimum cycle time is less than the time necessary for wire 11 to advance to the release assembly 36 to its full predetermined length, then the motor 40 can be intermittently driven by cyclically switching the motor on and off. This provides an actual cycle time of the oscillating cycle that depends upon the speed at which the wire advances. This may be the case for cutting longer segments of wire 11 above the predetermined length magnitude. Such longer wire cuts may be made on the rough order of about every 1–3 seconds. In any event, the controller drives the electrical motor 40 such that the cyclical frequency of the output signals from the end proximity switch 34 generally corresponds to the actual cyclical frequency at which the cutter 20 is oscillated.

To achieve the foregoing and other additional aspects of the present invention, the preferred embodiment incorporates a second proximity sensor in the form of a proximity switch 60 that senses position of the cutter 20 relative to the wire 11 or wire path 18. It will be appreciated that other forms of proximity sensors such as encoders other position sensing apparatus may also be used. The proximity switch 60 includes a cam 62 mounted on the cutter shaft 44 and a stationary sensor element 64 to sense the position of the cam 62. As can be appreciated, the position of the cam 62 correlates to the position of the cutter 20. The proximity switch 60 establishes a home position for the cutter shaft 44 and hence for the cutter 20 and signals the controller 58 via line 66 and through logic interface 70 each time the home position is reached. In this embodiment, the proximity switch 60 signals the controller 58 when it senses the leading edge and subsequent cam segment 68 of the cam 62 thereby establishing one home position per one revolution of the cutter shaft 44 (the home position also corresponds to a position of the cutter 20 which is out of the path of the advancing wire 11). Advantageously, this closes the loop and provides clear indication to the controller that the motor 40 needs to be stopped if the wire has not yet reached the release assembly 36 and advanced to its full predetermined length, thereby avoiding a short cut wire.

Figure 10:
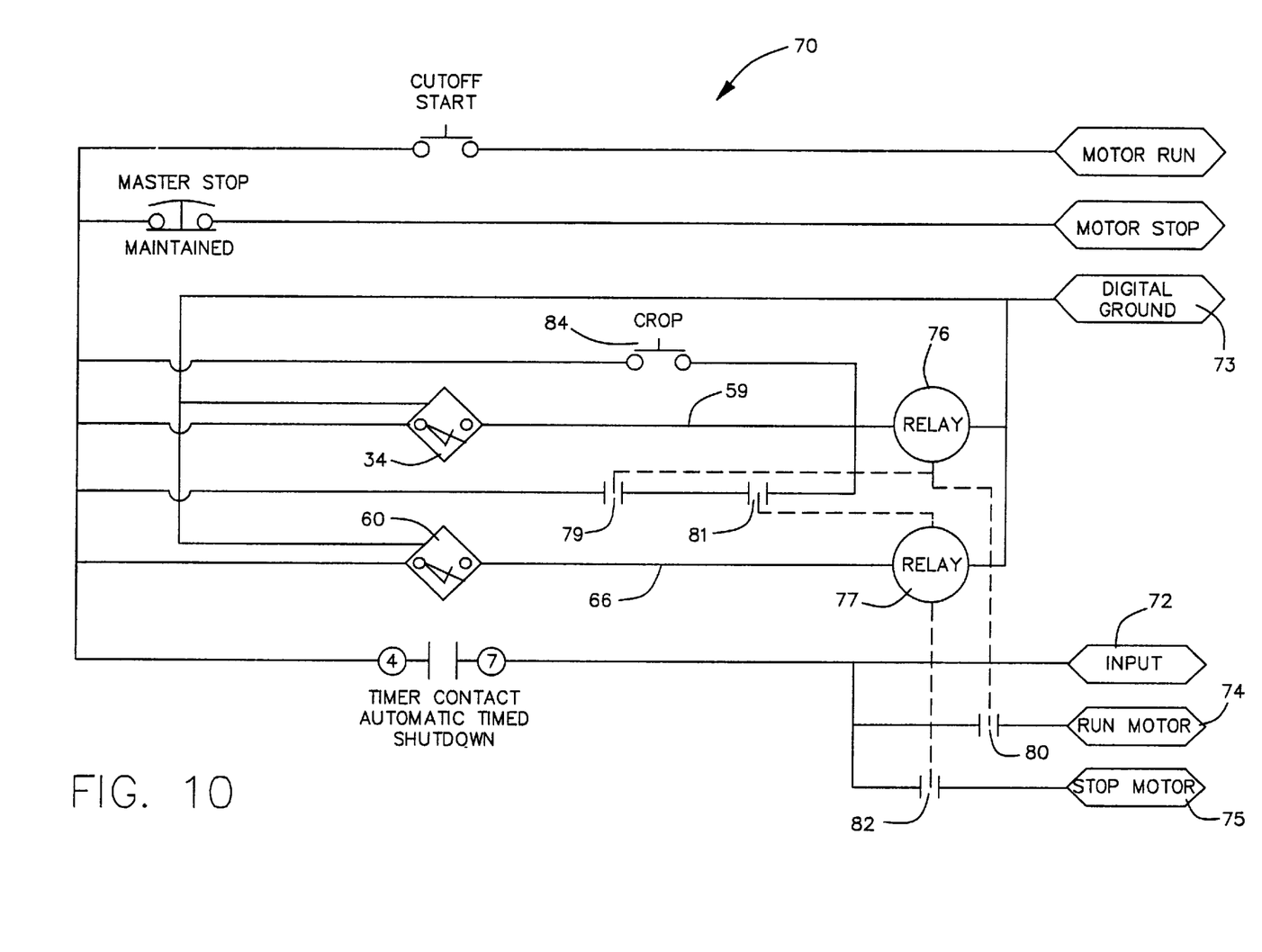
FIG. 10 is a schematic illustration of the interface circuit and proximity sensors illustrated to connection between the controller and the proximity sensors.

To allow the motor 40 to run continuously or intermittently as desired, the preferred embodiment includes a logic interface 70 between the two proximity switches 34, 60 and the controller 58, a schematic diagram of which is illustrated in FIG. 10. As shown, the interface circuit 70 includes a electrical source input 72, an electrical ground 73, and a start motor output 74 and a stop motor output 75, both outputs 74, 75 being output to the electronic controller 58 to inform the controller 58 whether the motor 40 needs to be driven or held in position. Each proximity switch 34, 60 switches on and off to activate a respective relay 76, 77. The first relay 76 operates two electrical switches 79, 80 to selectively provide electrical current flow therethrough. Likewise, the second relay 77 operates two electrical switches 81, 82 to selectively provide electrical current flow therethrough. As shown, the first relay 76 may also be activated by a manual switch 84 or also if contact is made through switches 79, 81 of the respective relays 76, 77.

When the end proximity switch 34 first senses wire via the release assembly, it is triggered to an on state which in turn activates the first relay 76 to make electrical contact between its two switches 79, 80. An electrical connection through the second switch 80 signals to the controller 58 to generate an electrical signal which accelerates the electrical motor 40 and drives the cutter 20 through the wire. After the wire cut is made the cut segment of wire is released by the trough 16 and the cutter 20 is still being driven and starts to retract out of the wire path. Once the cutter has retracted sufficiently another leading end segment of wire is advanced. When the cutter retracts past a predetermined location, the cutter proximity switch 60 activates to make electrical contact between its two switches 81, 82. An electrical connection through the second switch 82 signals to the controller 58 to generate a electrical signal which quickly decelerates the motor and then holds the rotor of the electrical motor 40 substantially stationary to allow the wire to fully advance. If however, the wire has already advance to it is predetermined length and has activated the end proximity switch 60 prior to the cutter fully retracting past the predetermined location and activating the cutter proximity switch 60 (and maybe partially advancing), then both first switches 79, and 81 are in electrical contact to maintain the first relay 76 in an energized state and therefore maintain the start motor output signal to the controller 58. The start motor output signal overrides the stop motor output signal and thus the motor is continuously driven through the cycle.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. An apparatus for cutting off successive leading end portions of wire adapted to be advanced along a predetermined wire path running through a cutting station, the apparatus comprising:

a support;

a cutter holder carried by the support having a wire cutter, the cutter holder being mobile relative to the support to work the wire cutter into the predetermined wire path;

an electrical motor carried by the support having an output directly driving the cutter holder;

a first proximity sensor arranged in sensory communication with the wire cutter adapted to produce a signal indicating location of the wire cutter relative to the wire path;

a second proximity sensor arranged downstream of the cutting station, adapted to produce a signal indicating presence of wire in proximity to the end of the predetermined wire path; and a controller responsive to the proximity sensors to control electrical output to the electrical motor, selectively generating a first electrical output to drive the motor and work the wire cutter into the predetermined wire path and a second electrical output to decelerate the motor and maintain the wire cutter adjacent to the predetermined wire path.

2. The apparatus of claim 1 wherein the first proximity sensor establishes a home position for the wire cutter that is adjacent to the wire path, and wherein the controller continuously generates the first electrical output to continuously drive the electrical motor when the controller receives a subsequent signal from the second proximity sensor after a wire cut but prior to the controller receiving the signal from the first proximity sensor indicating the home position of the wire cutter.

3. The apparatus of claim 2 wherein the length of the successive leading end portions are adjustable, the controller generating the first electrical output continuously for short lengths of leading end portions below a predetermined length and cyclically switching between the first and second electrical outputs for longer lengths of leading end portions above the predetermined length.

4. The apparatus of claim 1 wherein the electrical motor is a three phase induction alternating current motor and the controller is a variable frequency drive.

5. The apparatus of claim 4 wherein the variable frequency drive generates a sinusoidal wave to provide the first electrical output and generates a non-sinusoidal wave to provide the second electrical output.

6. The apparatus of claim 1 wherein the output of the motor is provided on an output shaft rotatable relative to the support, and further comprising a cutter shaft offset from the output shaft rotatable relative to the support having an eccentric acting directly on the cutter holder, and further comprising a clutchless direct drive coupling output shaft to the cutter shaft whereby the output shaft and cutter shaft rotate in unison.

7. The apparatus of claim 6 wherein the clutchless direct drive is a belt drive including a pair of sprockets respectively mounted on the cutter and output shafts, and an endless belt entrained around the sprockets.

8. The apparatus of claim 6 wherein the first proximity sensor comprises a stationary sensing element sensing the position of a cam secured to the cutter shaft for rotation relative to the sensing element.

9. An apparatus for cutting off successive leading end portions of wire adapted to be advanced along a predetermined wire path running through a cutting station, the apparatus comprising:

a wire cutting device for cutting wire;

an electrical motor having an output directly driving the wire cutting device;

a first proximity sensor arranged in sensory communication with the wire cutter device adapted to produce a signal indicating the position of the wire cutting device;

a second proximity sensor arranged downstream of the cutting station, adapted to produce a signal indicating presence of wire in proximity to the end of the predetermined wire path; and a controller responsive to the proximity sensors to control electrical output to the electrical motor, selectively generating a first electrical output to drive the motor and in turn operate the wire cutting device to cut wire, and a second electrical output to decelerate the motor and prevent the wire cutting device from cutting wire.

10. The apparatus of claim 9 wherein the wire cutting device comprises:

a support; and a cutter holder carried by the support having a wire cutter, the cutter holder adapted to oscillate relative to the support to work the wire cutter into the predetermined wire path, wherein the first proximity sensor adapted to produce a signal indicating location of the wire cutter relative to the wire path and the first electrical output drives the motor working the wire cutter into the predetermined wire path.

11. The apparatus of claim 10 wherein the first proximity sensor establishes a home position for the wire cutter that is adjacent to the wire path, and wherein the controller continuously generates the first electrical output to continuously drive the electrical motor when the controller receives a subsequent signal from the second proximity sensor after a wire cut but prior to the controller receiving the signal from the first proximity sensor indicating the home position of the wire cutter.

12. The apparatus of claim 10 wherein the output of the motor is provided on an output shaft rotatable relative to the support, and further comprising a cutter shaft offset from the output shaft rotatable relative to the support having an eccentric acting directly on the cutter holder, and further comprising a clutchless direct drive coupling output shaft to the cutter shaft whereby the output shaft and cutter shaft rotate in unison.

13. The apparatus of claim 12 wherein the clutchless direct drive is a belt drive including a pair of sprockets respectively mounted on the cutter and output shafts, and an endless belt entrained around the sprockets.

14. The apparatus of claim 12 wherein the first proximity sensor comprises a stationary sensing element sensing the position of a cam secured to the cutter shaft for rotation relative to the sensing element.

15. The apparatus of claim 9 wherein the length of the successive leading end portions are adjustable, the controller generating the first electrical output continuously for short lengths of leading end portions below a predetermined length and cyclically switching between the first and second electrical outputs for longer lengths of leading end portions above the predetermined length.

16. The apparatus of claim 9 wherein the electrical motor is a three phase induction alternating current motor and the controller is a variable frequency drive.

17. The apparatus of claim 16 wherein the variable frequency drive generates a sinusoidal wave to provide the first electrical output and generates a non-sinusoidal wave to provide the second electrical output.

\* \* \* \* \*